(12) United States Patent
Baldi et al.

(10) Patent No.: US 10,486,937 B2
(45) Date of Patent: Nov. 26, 2019

(54) USER MANAGEMENT OF DOOR AND ELEVATOR ACCESS CONTROL

(71) Applicant: Otis Elevator Company, Farmington, CT (US)

(72) Inventors: Emily Baldi, East Hartford, CT (US); Paul A. Simcik, Southington, CT (US); Yew Leong, Simsbury, CT (US); Sheryl Brothers, Wethersfield, CT (US); Ashley Chapman, Plainville, CT (US); Eric C. Peterson, East Longmeadow, MA (US); James Taylor, West Hartford, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 168 days.

(21) Appl. No.: 15/476,536

(22) Filed: Mar. 31, 2017

(65) Prior Publication Data
US 2018/0282114 A1 Oct. 4, 2018

(51) Int. Cl.
*B66B 1/34* (2006.01)
*B66B 1/24* (2006.01)
(Continued)

(52) U.S. Cl.
CPC .......... *B66B 1/3461* (2013.01); *B66B 1/2408* (2013.01); *B66B 1/468* (2013.01);
(Continued)

(58) Field of Classification Search
CPC ..... B66B 1/3461; B66B 1/2408; B66B 1/468; B66B 3/002
(Continued)

(56) References Cited

U.S. PATENT DOCUMENTS 5,749,443 A * 5/1998 Romao .................. B66B 1/468
  187/384
7,664,464 B2 * 2/2010 Gerstenkorn ...... G07C 9/00309
  187/380
(Continued)

FOREIGN PATENT DOCUMENTS

EP     2442282 A1    4/2012
ES     2605574 A1    3/2017
(Continued)

OTHER PUBLICATIONS

Kwikset, "Meet the Kevo App for Kevo Smart Lock", http://www.kwikset.com/kevo/application accessed Mar. 27, 2017, 2016 Spectrum Brands, Inc., 12 pgs.
(Continued)

*Primary Examiner* — David S Warren
(74) *Attorney, Agent, or Firm* — Cantor Colburn LLP

(57) ABSTRACT

A method of controlling access to a building is provided. The method comprising: receiving visitor contact information for a visitor from a resident device, the visitor contact information identifies a visitor device of the visitor; receiving visitor access permissions for the visitor from the resident device, the visitor access permissions include at least one of a selected elevator car, a selected door, and a selected floor; and granting the visitor device access to at least one of the selected elevator car, the selected door, and the selected floor.

18 Claims, 4 Drawing Sheets

400

404 — RECEIVING VISITOR CONTACT INFORMATION FOR A VISITOR FROM A RESIDENT DEVICE, THE VISITOR CONTACT INFORMATION IDENTIFIES A VISITOR DEVICE OF THE VISITOR

406 — RECEIVING VISITOR ACCESS PERMISSIONS FOR THE VISITOR FROM THE RESIDENT DEVICE, THE VISITOR ACCESS PERMISSIONS INCLUDE AT LEAST ONE OF A SELECTED ELEVATOR CAR, A SELECTED DOOR, AND A SELECTED FLOOR

408 — GRANTING THE VISITOR DEVICE ACCESS TO AT LEAST ONE OF THE SELECTED ELEVATOR CAR, THE SELECTED DOOR, AND THE SELECTED FLOOR

(51) Int. Cl.
*B66B 3/00* (2006.01)
*B66B 13/16* (2006.01)
*B66B 1/46* (2006.01)
*H04W 88/02* (2009.01)

(52) U.S. Cl.
CPC ............ *B66B 3/002* (2013.01); *B66B 13/165* (2013.01); *B66B 2201/23* (2013.01); *B66B 2201/401* (2013.01); *B66B 2201/402* (2013.01); *B66B 2201/405* (2013.01); *B66B 2201/4653* (2013.01); *H04W 88/02* (2013.01)

(58) Field of Classification Search
USPC .......................................................... 187/247
See application file for complete search history.

(56) References Cited

U.S. PATENT DOCUMENTS

| | | | |
|---|---|---|---|
| 8,150,374 | B2 | 4/2012 | Lowe |
| 9,424,699 | B2 | 8/2016 | Kusens et al. |
| 9,524,594 | B2 | 12/2016 | Ouyang et al. |
| 9,554,277 | B2 | 1/2017 | G et al. |
| 9,945,675 | B2 * | 4/2018 | Schuster ................. B66B 1/468 |
| 2007/0045051 | A1 * | 3/2007 | Gerstenkorn ........... B66B 1/468 187/380 |
| 2011/0247901 | A1 * | 10/2011 | Wilke ..................... B66B 1/468 187/247 |
| 2012/0253658 | A1 | 10/2012 | Kappeler et al. |
| 2012/0305339 | A1 * | 12/2012 | Korhonen ............... B66B 1/468 187/380 |
| 2012/0305340 | A1 * | 12/2012 | Wu ........................... B66B 1/34 187/381 |
| 2013/0031611 | A1 | 1/2013 | Barreto |
| 2013/0048435 | A1 * | 2/2013 | Finschi ................... B66B 1/468 187/381 |
| 2013/0212661 | A1 | 8/2013 | Neafsey et al. |
| 2014/0305747 | A1 * | 10/2014 | Kumar ..................... B66B 1/468 187/381 |
| 2015/0199863 | A1 | 7/2015 | Scoggins et al. |
| 2015/0204678 | A1 * | 7/2015 | Schuster ................. B66B 1/468 701/522 |
| 2015/0368067 | A1 * | 12/2015 | Tang .................... H04B 5/0025 187/380 |
| 2016/0009525 | A1 * | 1/2016 | DePaola ................. B66B 1/468 187/380 |
| 2016/0105435 | A1 | 4/2016 | Turner et al. |
| 2016/0152439 | A1 * | 6/2016 | MacDonald ............. B66B 1/46 187/384 |
| 2016/0284139 | A1 | 9/2016 | Klein et al. |
| 2016/0316178 | A1 | 10/2016 | Hoeffner et al. |
| 2016/0380774 | A1 | 12/2016 | Lovelock et al. |
| 2017/0088397 | A1 * | 3/2017 | Buckman ................ H04W 4/80 |
| 2017/0270725 | A1 * | 9/2017 | Troesch .................. B66B 1/468 |
| 2018/0182199 | A1 * | 6/2018 | Yamine ............... G07C 9/00896 |
| 2018/0282114 | A1 * | 10/2018 | Baldi .................... B66B 1/3461 |

FOREIGN PATENT DOCUMENTS

| | | |
|---|---|---|
| JP | 2008225851 A | 9/2008 |
| WO | 2014116182 A1 | 7/2014 |
| WO | 2016087478 A1 | 6/2016 |
| WO | 2016087483 A1 | 6/2016 |
| WO | 2016089832 A1 | 6/2016 |
| WO | 2016089841 A1 | 6/2016 |
| WO | 2016089846 A1 | 6/2016 |
| WO | 2016166362 A1 | 10/2016 |
| WO | 2017025106 A1 | 2/2017 |

OTHER PUBLICATIONS

Woollaston, Victoria, "The smart lock that lets you open your front door using just your phone—and can even let in guests when you're not home", DailyMail.com, May 30, 2013, 20pgs.

The Extended European Search Report for Application No. 18165011.0; dated Oct. 16, 2018; 10 pages.

* cited by examiner

USER MANAGEMENT OF DOOR AND ELEVATOR ACCESS CONTROL

BACKGROUND

The subject matter disclosed herein generally relates to the field of building access controls, and more particularly to an apparatus and method for controlling access to elevators, floors, and/or doors within a building.

Existing building access controls require a building supervisor to control user access to building doors, floors, and/or elevators.

BRIEF SUMMARY

According to one embodiment, a method of controlling access to a building is provided. The method comprising: receiving visitor contact information for a visitor from a resident device, the visitor contact information identifies a visitor device of the visitor; receiving visitor access permissions for the visitor from the resident device, the visitor access permissions include at least one of a selected elevator car, a selected door, and a selected floor; and granting the visitor device access to at least one of the selected elevator car, the selected door, and the selected floor.

In addition to one or more of the features described above, or as an alternative, further embodiments of the method may include where at least one of the resident device and the visitor device is a mobile device.

In addition to one or more of the features described above, or as an alternative, further embodiments of the method may include transmitting a notification to the visitor device when access is granted.

In addition to one or more of the features described above, or as an alternative, further embodiments of the method may include where the visitor device is granted access for at least one of a selected period of time, a selected date, and a reoccurring schedule.

In addition to one or more of the features described above, or as an alternative, further embodiments of the method may include generating access permissions for the visitor in response to existing access permissions in a user access database.

In addition to one or more of the features described above, or as an alternative, further embodiments of the method may include generating on a user interface an invite guest screen on the resident device, the invite guest screen being configured to allow entry of visitor contact information.

In addition to one or more of the features described above, or as an alternative, further embodiments of the method may include generating on a user interface a visitor access screen on the resident device, the visitor access screen configured to display access permissions.

In addition to one or more of the features described above, or as an alternative, further embodiments of the method may include where the granting further comprises: unlocking the selected door when the visitor device is presented to the selected door.

In addition to one or more of the features described above, or as an alternative, further embodiments of the method may include where the granting further comprises: opening the selected elevator car when the visitor device is presented to the selected elevator car.

In addition to one or more of the features described above, or as an alternative, further embodiments of the method may include where the granting further comprises: moving the selected elevator car to the selected floor when the visitor device is presented to the selected elevator car.

In addition to one or more of the features described above, or as an alternative, further embodiments of the method may include where the visitor device is granted access for at least one of a selected period of time, a selected date, and a reoccurring schedule.

In addition to one or more of the features described above, or as an alternative, further embodiments of the method may include generating access permissions for the visitor in response to existing access permissions in a user access database.

In addition to one or more of the features described above, or as an alternative, further embodiments of the method may include: generating on a user interface an invite guest screen on the resident device, the invite guest screen being configured to allow entry of visitor contact information.

In addition to one or more of the features described above, or as an alternative, further embodiments of the method may include generating on a user interface a visitor access screen on the resident device, the visitor access screen configured to display access permissions.

In addition to one or more of the features described above, or as an alternative, further embodiments of the method may include where the granting further comprises: unlocking the selected door when the visitor device is presented to the selected door.

In addition to one or more of the features described above, or as an alternative, further embodiments of the method may include where the granting further comprises: opening the selected elevator car when the visitor device is presented to the selected elevator car.

In addition to one or more of the features described above, or as an alternative, further embodiments of the method may include where the granting further comprises: moving the selected elevator car to the selected floor when the visitor device is presented to the selected elevator car.

According to another embodiment, a building access system is provided. The building access system comprising: a processor; a memory comprising computer-executable instructions that, when executed by the processor, cause the processor to perform operations. The operations comprising: receiving visitor contact information for a visitor from a resident device, the visitor contact information identifies a visitor device of the visitor; receiving visitor access permissions for the visitor from the resident device, the visitor access permissions include at least one of a selected elevator car, a selected door, and a selected floor; and granting the visitor device access to at least one of the selected elevator car, the selected door, and the selected floor.

In addition to one or more of the features described above, or as an alternative, further embodiments of the building access system may include where at least one of the resident device and the visitor device is a mobile device.

According to another embodiment, a computer program product tangibly embodied on a computer readable medium is provided. The computer program product including instructions that, when executed by a processor, cause the processor to perform operations comprising: receiving visitor contact information for a visitor from a resident device, the visitor contact information identifies a visitor device of the visitor; receiving visitor access permissions for the visitor from the resident device, the visitor access permissions include at least one of a selected elevator car, a selected door, and a selected floor; and granting the visitor device access to at least one of the selected elevator car, the selected door, and the selected floor.

Technical effects of embodiments of the present disclosure include the ability for a user to grant a visitor access to a building door, floors, and/or an elevator through a user interface.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

DETAILED DESCRIPTION

A detailed description of one or more embodiments of the disclosed apparatus and method are presented herein by way of exemplification and not limitation with reference to the Figures.

Figure 1:
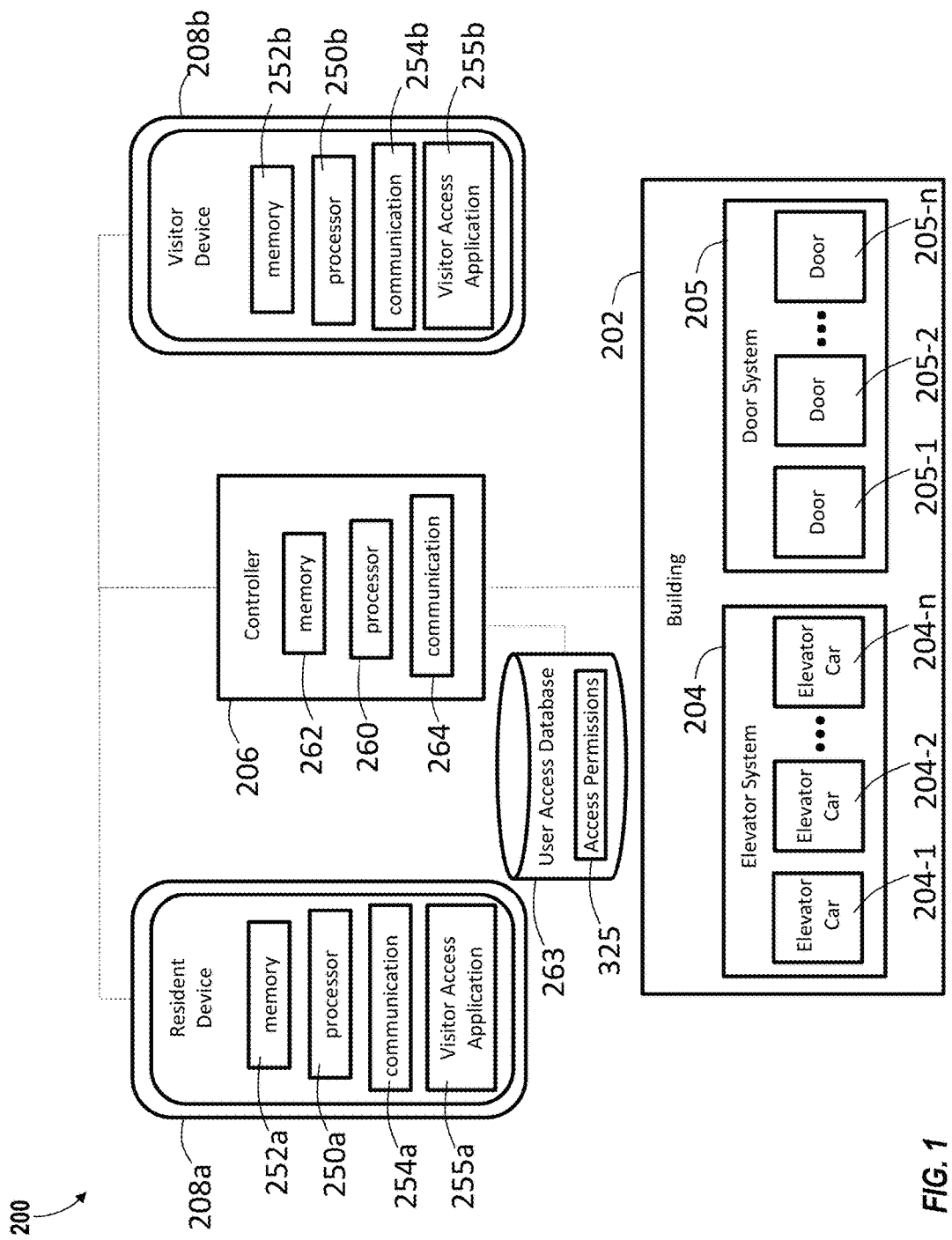
FIG. 1 illustrates a schematic view of a building access system, in accordance with an embodiment of the disclosure.

FIG. 1 depicts a building access system 200 in an example embodiment. The building access system 200 includes a door system 205 and an elevator system 204 installed at a building 202. In some embodiments, the building 202 may be a building or a collection of buildings that may or may not be physically located near each other. The building 202 may include any number of floors. Persons entering the building 202 may enter at a lobby floor, or any other floor, and may go to a destination floor via one or more conveyance devices, such as the elevator system 204. Persons entering the building 202 may be required to enter a door (e.g., doors 205-1, 205-2 . . . 205-n) of the door system 205. The door (e.g., doors 205-1, 205-2 . . . 205-n) may include but is not limited to a door in a wall of the building, a door on the outside of the building, a garage door, a parking lot access gate, a turnstile or similar access restriction device known to one of skill in the art.

The elevator system 204 may be operably connected to one or more computing devices, such as a controller 206. The controller 206 may be configured to control dispatching operations for one or more elevator cars (e.g., elevator cars 204-1, 204-2 . . . 204-n) associated with the elevator system 204. The controller 206 may also be configured to control access to the one or more elevator cars (e.g., elevator cars 204-1, 204-2 . . . 204-n) associated with the elevator system 204. It is understood that the elevator system 204 may utilize more than one controller 206, and that each controller may control a group of elevators cars 204-1 and 204-2. Although two elevator cars 204-1 and 204-2 are shown in FIG. 1, it is understood that any number of elevators cars 204-n may be used in the elevator system 204. The elevator cars 204-1 and 204-2 may be located in the same hoistway or in different hoistways so as to allow coordination amongst elevator cars 204-1 and 204-2 in different elevator banks serving different floors. It is understood that other components of the elevator system 204 (e.g., drive, counterweight, safeties, etc.) are not depicted for ease of illustration.

Further, the controller 206 may also be configured to control access to one or more doors (e.g., doors 205-1, 205-2 . . . 205-n). It is understood that the door system 205 may utilize more than one controller 206, and that each controller may control a group of doors 205-1 and 205-2. Although two doors 205-1 and 205-2 are shown in FIG. 1, it is understood that any number of elevators cars 205-n may be used in the door system 205. It is understood that other components of the door system 205 (e.g., locks) are not depicted for ease of illustration. Additionally, the controller 206 may be configured to control access to one or more floors through the elevator system 204 and/or door system 205.

The controller 206 may include a processor 260, memory 262 and communication module 264 as shown in FIG. 1. The processor 260 can be any type or combination of computer processors, such as a microprocessor, microcontroller, digital signal processor, application specific integrated circuit, programmable logic device, and/or field programmable gate array. The memory 262 is an example of a non-transitory computer readable storage medium tangibly embodied in the controller 206 including executable instructions stored therein, for instance, as firmware. The communication module 264 may implement one or more communication protocols as described in further detail herein.

Also shown in FIG. 1 is a resident device 208a. The resident device 208a may be a computing device such as a desktop computer. The resident device 208a may also be a mobile computing device that is typically carried by a person, such as, for example a phone, PDA, smart watch, tablet, laptop, etc. The resident device 208a may include a processor 250a, memory 252a and communication module 254a as shown in FIG. 1. The processor 250a can be any type or combination of computer processors, such as a microprocessor, microcontroller, digital signal processor, application specific integrated circuit, programmable logic device, and/or field programmable gate array. The memory 252a is an example of a non-transitory computer readable storage medium tangibly embodied in the resident device 208a including executable instructions stored therein, for instance, as firmware. The communication module 254a may implement one or more communication protocols as described in further detail herein. The resident device 208a belongs to a resident of the building 202 who currently has access to the elevator system 204 and door system 205. Each resident of the building 202 may have specific access permissions 325 granting each resident access to selected elevators cars, selected floors of the building and/or selected doors. The access permissions 325 may be stored in a user access database 263 operatively connected to the controller 206 or stored within the controller 206. In one embodiment, the user access database 263 may be stored offsite, remotely, or in the cloud.

Also shown in FIG. 1 is a visitor device 208b. The visitor device 208b may be a computing device such as a desktop computer. The visitor device 208b may also be a mobile computing device that is typically carried by a person, such as, for example a phone, PDA, smart watch, tablet, laptop, etc. The visitor device 208b may include a processor 250b, memory 252b and communication module 254b as shown in FIG. 1. The processor 250b can be any type or combination of computer processors, such as a microprocessor, microcontroller, digital signal processor, application specific integrated circuit, programmable logic device, and/or field programmable gate array. The memory 252b is an example of a non-transitory computer readable storage medium tangibly embodied in the visitor device 208b including executable instructions stored therein, for instance, as firmware. The communication module 254b may implement one or more communication protocols as described in further detail herein. The visitor device 208b may belong to a visitor of the building 202, such as, for example, food delivery person, parcel delivery person, serve/maintenance person, baby sitter, long-term visitor, short term visitor, and reoccurring visitor.

The resident device 208a and visitor device 208b may both be referred to as a device 208 for ease of explanation. The device 208 and the controller 206 communicate with one another. For example, the device 208 and the controller 206 may communicate with one another when proximate to one another (e.g., within a threshold distance). The device 208 and the controller 206 may communicate over a wireless network, such as 802.11x (WiFi), short-range radio (Bluetooth), cellular, satellite, etc. In some embodiments, the controller 206 may include, or be associated with (e.g., communicatively coupled to) a networked element, such as a kiosk, beacon, hall call fixture, lantern, bridge, router, network node, door lock, elevator control panel, building intercom system, etc. The networked element may communicate with the device 208 using one or more communication protocols or standards. For example, the networked element may communicate with the device 208 using near field communications (NFC). In other embodiments, the controller 206 may establish communication with a device 208 that is outside of the building 202. This connection may be established with various technologies including GPS, triangulation, or signal strength detection, by way of non-limiting example. In example embodiments, the device 208 communicates with the controller 206 over multiple independent wired and/or wireless networks. Embodiments are intended to cover a wide variety of types of communication between the device 208 and controller 206, and embodiments are not limited to the examples provided in this disclosure. Communication between the device 208 and the controller 206 will allow the controller 206 to determine the location of the device 208 in relation to the elevator system 204 and/or the door system 205. Knowing the relative location of the device 208 will allow the controller 206 to determine when the device 208 is being presented at an elevator system 204 and/or a door system 205 to request access.

Embodiments generate a user interface on the device 208 through a visitor access application 255a, 255b. The visitor access application 255a may be used for residents to grant access to visitors to selected elevators cars, selected floors of the building 202, and/or selected doors of the building 202. For example, a resident using the visitor access application 255a on the resident device 208a may grant access to visitor and the visitor device 208b will be used as identification to open the selected elevators cars, selected floors of the building 202 and/or selected doors of the building 202. For example, a resident may grant access to a babysitter to open the front door of the building 202, take the first elevator car up to the fifth floor and then open the door of the resident. While in the building the babysitter may not have access to any other doors, elevators, or floors other than what was granted by the resident. An identification credential on the visitor device 208b will identify the visitor through communication with the controller 206 at each selected elevators car, selected floor, and selected door.

Figure 2:
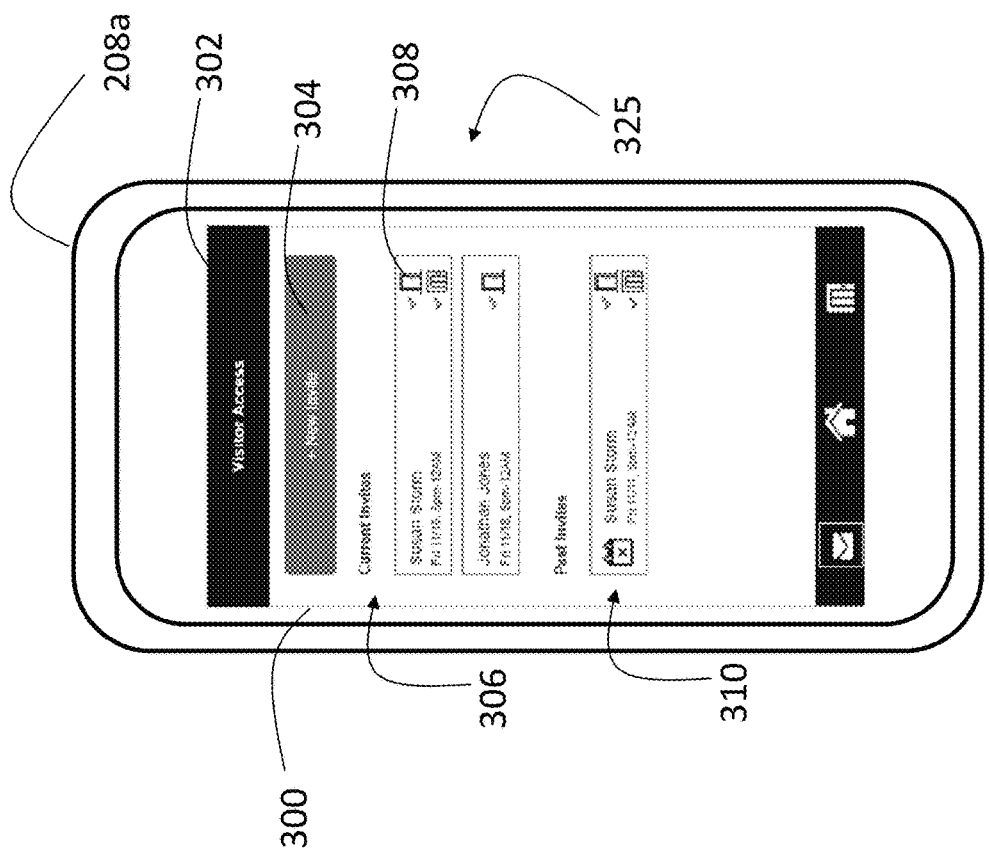
FIG. 2 depicts a user interface on a device, in accordance with an embodiment of the disclosure.
Figure 3:
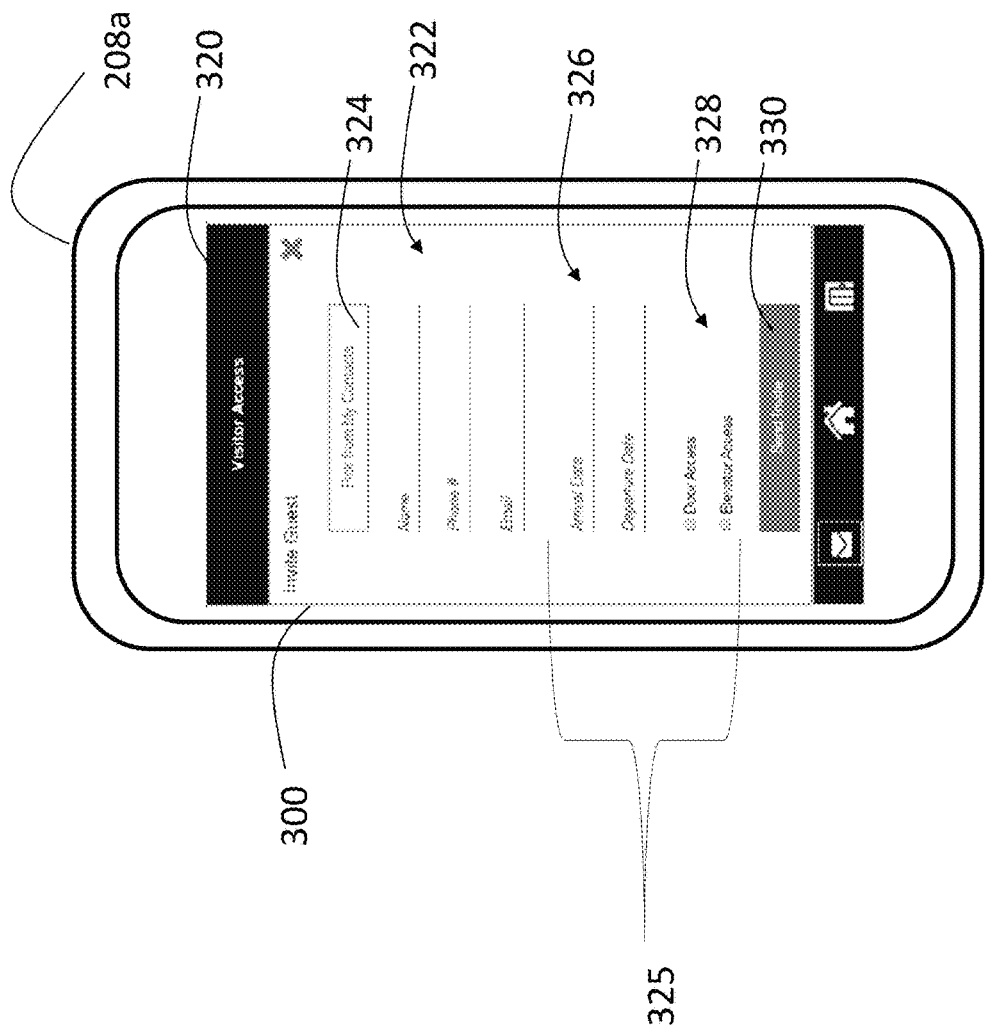
FIG. 3 depicts a user interface on a device, in accordance with an embodiment of the disclosure.

FIGS. 2-3 depict an example user interface 300 on resident device 208a. Referring to FIG. 2, when the resident device 208a launches the visitor access application 255a, a visitor access screen 302 may be presented as shown in FIG. 2. The visitor access screen 302 includes a new invite button 304, where new visitors may be added. Also, included on the visitor access screen 302 are the current invites 306. As shown, the current invites 306 may be identified and organized by name. The access permissions 325 of the current invites 306 may also be listed. For instance, a current invite 306 may have access for a selected date and/or a selected time period. The access permissions 325 expire after the selected date and/or a selected time period. In one embodiment, the access may be granted at a recurring day and time or group of recurring dates and times, e.g., every Tuesday from 2-4 PM, or every Monday-Friday 9 AM-5 PM. Further, the visitor access screen 302 may include display icons 308 illustrating what the current invite 306 has access to, including but not limited to elevator, door, and floor icons. The visitor access screen 302 may also display past invites 310 and the access permissions 325 that each past invite had been granted.

As mentioned above, the resident may grant access to a new visitor through the new invite button 304. Once the new invite button 304 is selected, the resident device 208 launches an invite guest screen 320 in the visitor access application 255a. The invite guest screen 320 may be presented as shown in FIG. 3. On the invite guest screen 320, the resident may manually enter in contact information 322 of the visitor or import the contact information of the visitor from the resident's contact list on the resident device 208a by selecting the pick from my contacts button 324. The contact information 322 may include identification factors of the visitor including but not limited to name, phone number, and email. The resident may also enter access permissions 325 associated with each visitor. The access permissions 325 may include a selected time period 326 for access, including but not limited to a selected access date, selected access time, and a selected reoccurring schedule. The resident may also designate access permissions 325 including but not limited to selected elevators cars, selected floors of the building, and/or selected doors of the building. Advantageously, by granting access to only selected floors of the building, the elevator will take the visitor to the selected floor only, which prevent the visitor from accessing any other floor of the building. Further, stairwell doors may further restrict a visitor's access to different floors. The resident may also duplicate their own access permissions 325 or previously granted access permissions 325 to another visitor stored within the user access database 263 (see FIG. 1) and apply these access permissions 325 to a visitor. Once the invite guest screen 320 is completed, the resident may transmit the access to the visitor by selecting the "send invite" button 330. The transmission may show up as an alert on the visitor device 208b (see FIG. 1). The alert may be audible and/or visual. The alert may prompt the visitor to download the visitor access application 255b on the visitor device and/or may simply inform the visitor of the access permissions 325 granted. When the resident selects the "send invite" button 330, the access permission 325 are also sent to the controller and stored in the user access database 263. As mentioned above, each device may have an identification credential and knowing the relative location of the device 208 will allow the controller 206 to determine when the device 208 is being presented at an elevator system 204 and/or a door system 205 to request access. In a non-limiting exemplary embodiment, access may be logically driven by an app which uses resources local to the visitor's smartphone (e.g. GPS location, biometric validation of user, etc.) and an encrypted key which is sent to the building system by a range of means (e.g. NFC, BT, wifi, cell network, display of linear or 2D bar code, audio tones) or combinations thereof. Further, in a non-limiting exemplary embodiment, access may also be logically driven by the building system without requiring download of an app on the visitor's device. Such means may include detecting and validating known visitor device parameters, e.g. MAC address, or credentials specially created for this transaction, e.g. 2D bar code sent via email, MMS, or other means.

Figure 4:
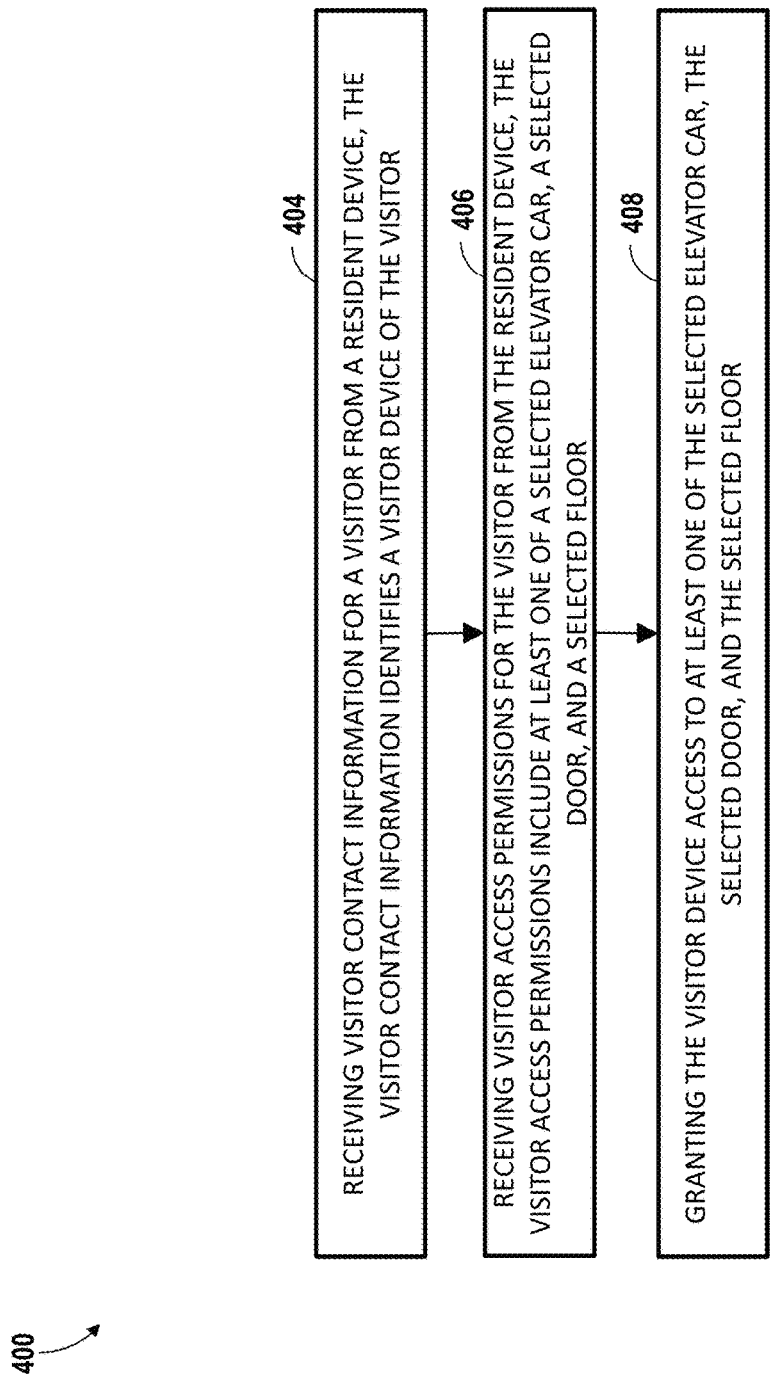
FIG. 4 is a flow diagram illustrating a method of controlling access to a building, according to an embodiment of the present disclosure.

Referring now to FIG. 4, while referencing components of FIGS. 1-3. FIG. 4 shows a flow chart of method 400 of granting access to a building 202, in accordance with an embodiment of the disclosure. At block 404, the controller 206 receives visitor contact information 322 for a visitor from a resident device 208a. As mentioned above, the visitor contact information 322 identifies a visitor device 208b of the visitor. The visitor contact information 322 may be entered into the visitor access application 255a manually by a resident of the building. In order to allow entry of the visitor contact information 322, the visitor access application 255a generates through a user interface 300 an invite guest screen 320 on the resident device 208a. The invite guest screen 320 is configured to allow entry of visitor contact information 322. Alternatively, the visitor contact information 322 may be generated in response to existing access permissions 325 stored in a user access database 263 operably connected to the controller 206.

At block 406, the controller 206 receives visitor access permissions 325 for the visitor from the resident device 208a. The visitor access permissions 325 include at least one of a selected elevator car, a selected door, and a selected floor. The visitor access permissions 325 may also include a time limitation on the access permissions 325 including at least one of a selected period of time, a selected date, and a reoccurring schedule.

At block 408, the controller 206 grants the visitor device 208b access to at least one of the selected elevator car, the selected door, and the selected floor. Access may be granted for a specific time including at least one of a selected period of time, a selected date, and a reoccurring schedule. Once access is granted, a notification may be sent to the visitor device 208b. The notification may indicate that access has been granted to the visitor to at least one of a selected door, a selected elevator car, and a selected floor. A visitor access screen 302 may also be generated on the resident device 208a. The visitor access screen 302 is configured to display access permissions 325 of current invitees 306. Once access is granted, the visitor will now be able to use the visitor device 208b to access at least one of the selected elevator car, the selected door, and the selected floor. In one example, a selected door will unlock when the visitor device 208b is presented to the selected door once access has been granted. In a second example, a selected elevator car will open when the visitor device 208b is presented to the selected elevator car once access has been granted. In a third example, the selected elevator car will move to the selected floor when the visitor device 208b is presented to the selected elevator car once access has been granted.

While the above description has described the flow process of FIG. 4 in a particular order, it should be appreciated that unless otherwise specifically required in the attached claims that the ordering of the steps may be varied.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of controlling access to a building, the method comprising:
   receiving visitor contact information for a visitor from a resident device, the visitor contact information identifies a visitor device of the visitor;
   generating on a user interface of the resident device a visitor access screen, the visitor access screen configured to display access permissions;
   receiving visitor access permissions for the visitor entered from the resident device via the visitor access screen by a resident using the resident device, the visitor access permissions include a selected floor individually selected by the resident via the visitor access screen; and granting the visitor device access to the selected floor individually selected by the resident via the visitor access screen.

2. The method of claim 1, wherein:
at least one of the resident device and the visitor device is a mobile device.

3. The method of claim 2, further comprising:
transmitting a notification to the visitor device when access is granted.

4. The method of claim 2, wherein:
the visitor device is granted access for at least one of a selected period of time, a selected date, and a reoccurring schedule.

5. The method of claim 2, further comprising:
generating on a user interface an invite guest screen on the resident device, the invite guest screen being configured to allow entry of visitor contact information.

6. The method of claim 2, wherein the granting further comprises:
unlocking the selected door when the visitor device is presented to the selected door.

7. The method of claim 2, wherein the visitor access permissions include a selected door individually selected by the resident via the visitor access screen, and wherein the granting further comprises:
opening the selected elevator car when the visitor device is presented to the selected elevator car.

8. The method of claim 2, wherein the visitor access permissions include a selected elevator car individually selected by the resident via the visitor access screen, and wherein the granting further comprises:
moving the selected elevator car to the selected floor when the visitor device is presented to the selected elevator car.

9. The method of claim 3, wherein:
the visitor device is granted access for at least one of a selected period of time, a selected date, and a reoccurring schedule.

10. The method of claim 3, further comprising:
generating access permissions for the visitor in response to existing access permissions in a user access database.

11. The method of claim 3, further comprising:
generating on a user interface an invite guest screen on the resident device, the invite guest screen being configured to allow entry of visitor contact information.

12. The method of claim 3, wherein the visitor access permissions include a selected door individually selected by the resident via the visitor access screen, and wherein the granting further comprises:
unlocking the selected door when the visitor device is presented to the selected door.

13. The method of claim 3, wherein the visitor access permissions include a selected elevator car individually selected by the resident via the visitor access screen, and wherein the granting further comprises:
opening the selected elevator car when the visitor device is presented to the selected elevator car.

14. The method of claim 3, wherein the visitor access permissions include a selected elevator car individually selected by the resident via the visitor access screen, and wherein the granting further comprises:
moving the selected elevator car to the selected floor when the visitor device is presented to the selected elevator car.

15. The method of claim 1, further comprising:
preventing the visitor device access to elevator cars not individually selected by the resident via the visitor access screen, doors not individually selected by the resident via the visitor access screen, and floors not individually selected by the resident via the visitor access screen.

16. A building access system comprising:
a processor;
a memory comprising computer-executable instructions that, when executed by the processor, cause the processor to perform operations, the operations comprising:
generating on a user interface of the resident device a visitor access screen, the visitor access screen configured to display access permissions;
receiving visitor contact information for a visitor entered from a resident device via the visitor access screen by a resident using the resident device, the visitor contact information identifies a visitor device of the visitor;
receiving visitor access permissions for the visitor from the resident device, the visitor access permissions include a selected floor individually selected by the resident via the visitor access screen; and
granting the visitor device access to the selected floor individually selected by the resident via the visitor access screen.

17. The building access system of claim 16, wherein:
at least one of the resident device and the visitor device is a mobile device.

18. A method of controlling access to a building, the method comprising:
receiving visitor contact information for a visitor from a resident device, the visitor contact information identifies a visitor device of the visitor;
generating access permissions for the visitor device based on existing access permissions belonging to the resident device in a user access database, the visitor access permissions include a selected elevator car accessible by the resident device, a selected door accessible by the resident device, and a selected floor accessible by the resident device; and
granting the visitor device access to the selected elevator car accessible by the resident device, the selected door accessible by the resident device, and the selected floor accessible by the resident device.

* * * * *